US008214522B2

(12) United States Patent
Chanda (10) Patent No.: US 8,214,522 B2
(45) Date of Patent: Jul. 3, 2012

(54) INTERNET PROTOCOL VERSION 6 NETWORK CONNECTIVITY IN A VIRTUAL COMPUTER SYSTEM

(75) Inventor: Anupam Chanda, Cupertino, CA (US)
(73) Assignee: VMware, Inc., Palo Alto, CA (US)
( * ) Notice: Subject to any disclaimer, the term of this patent is extended or adjusted under 35 U.S.C. 154(b) by 470 days.

(21) Appl. No.: 12/437,405
(22) Filed: May 7, 2009
(65) Prior Publication Data

US 2010/0287304 A1  Nov. 11, 2010

(51) Int. Cl.
*G06F 15/16* (2006.01)
(52) U.S. Cl. ........ 709/236; 709/245; 709/230; 709/238; 709/239
(58) Field of Classification Search .................. 709/236, 709/245, 230, 238, 239
See application file for complete search history.

(56) References Cited

U.S. PATENT DOCUMENTS

| | | | |
|---|---|---|---|
| 6,172,981 | B1 | 1/2001 | Cox et al. |
| 6,212,563 | B1 | 4/2001 | Beser |
| 6,496,847 | B1 | 12/2002 | Bugnion et al. |
| 7,111,303 | B2 | 9/2006 | Macchiano et al. |
| 7,127,524 | B1 | 10/2006 | Renda et al. |
| 7,213,065 | B2 | 5/2007 | Watt |
| 7,228,337 | B1 | 6/2007 | Bornstein et al. |
| 7,478,173 | B1 | 1/2009 | Delco |
| 2004/0267866 | A1 | 12/2004 | Carollo et al. |
| 2005/0027834 | A1 | 2/2005 | Chen et al. |
| 2005/0132365 | A1* | 6/2005 | Madukkarumukumana et al. ................................. 718/1 |
| 2009/0067440 | A1* | 3/2009 | Chadda et al. ................. 370/401 |
| 2009/0245278 | A1* | 10/2009 | Kee ................................. 370/467 |

OTHER PUBLICATIONS

Freesoft, "RFC 2131 Protocol Summary," Jan. 18, 1998, 3 Pages, <http://web.archive.org/web/19980118180533/http://www.freesoft.org/CIE/RFC/2131/8.htm>.
Kuciel, Jim, "Link Aggregation with 802.3ad," Nov. 13, 2000, Network World, pp. 1-3, <http://www.itworld.com/Net/1750/NWW001113tech/>.
Cisco Press, "Ethernet Technologies," Jan. 24, 2002, pp. 1-36, <http://web.archive.org/web/20020124175541/http://www.cisco.com/univercd/cc/td/doc/cisintwk/ito_doc/ethernet.htm>.

[RFC791] Information Sciences Institute, University of Southern California, "RFC 791—Internet Protocol", Sep. 1981, 37 Pages, http://www.faqs.org/rfcs/rfc791.html.
[RFC2460] S. Deering and R. Hinden, "RFC 2460—Internet Protocol, Version 6 (IPv6) Specification", Dec. 1998, 29 Pages, http://www.faqs.org/rfcs/rfc2460.html.
[RFC2463] A. Conta and S. Deering, "RFC 2463—Internet Control Message Protocol (ICMPv6) for the Internet Protocol Version 6 (IPv6) Specification", Dec. 1998, 14 Pages, http://www.faqs.org/rfcs/rfc2463.html. [RFC4861] T. Narten, E. Nordmark, W. Simpson, H. Soliman, "RFC 4861—Neighbor Discovery for IP version 6 (IPv6)", Sep. 2007, 76 Pages, http://www.faqs.org/rfcs/rfc4861.html.
[IPHelperAPI] Microsoft, "Windows Driver Kit: Network Devices and Protocols—IP Helper API", May 31, 2009, 1 Page., http://msdn.microsoft.com/en-us/library/bb663178.aspx.
Office Action dated Aug. 22, 2007 in U.S. Appl. No. 10/741,242.
Response to Office Action dated Feb. 21, 2008 in U.S. Appl. No. 10/741,242.
Office Action dated Jun. 16, 2008 in U.S. Appl. No. 10/741,242.
Response to Office Action dated Jun. 20, 2008 in U.S. Appl. No. 10/741,242.
Final Office Action dated Oct. 3, 2008 in U.S. Appl. No. 10/741,242.
Response to Final Office Action dated Oct. 8, 2008 in U.S. Appl. No. 10/741,242.

* cited by examiner

Primary Examiner — Lan-Dai T Truong (57) ABSTRACT

A method for sharing a network connection between a host system and a virtual machine is disclosed. The method includes sending an outgoing data frame from the virtual machine to a computer network. The host system is enabled to use the network connection using a first layer 2 address and a first layer 3 address. The first layer 2 and the first layer 3 addresses are associated with the network connection. The virtual machine is enabled to attempt to use the network connection using a second layer 2 address and a second layer 3 address. The first layer 3 and the second layer 3 addresses are compliant with IPv6. An occurrence of the second layer 2 address is replaced within the outgoing data frame with the first layer 2 address. If the outgoing data frame includes a network discover protocol (NDP) message of a selected type, the second layer 2 address in the NDP message is replaced by the first layer 2 address.

12 Claims, 6 Drawing Sheets

| VM IP ADDR | VM MAC ADDR |
|---|---|
| 10.45.230.21 | 00-1C-23-34-7D-A4 |
| 10.45.230.25 | 00-1E-23-64-7B-D7 |
| 10.45.230.29 | 00-1B-29-33-6D-C4 |

INTERNET PROTOCOL VERSION 6 NETWORK CONNECTIVITY IN A VIRTUAL COMPUTER SYSTEM

BACKGROUND

Internet Protocol Version 6 (IPv6) is the successor of Internet Protocol Version 4 (IPv4). IPv6 differs from IPv4 in many aspects. For example, Internet Protocol (IP) addresses are 128 bits long in IPv6 and 32 bits long in IPv4. IPv6 also provides improved support for extension and option headers and provides extensions to support authentication, data integrity, and confidentiality, etc.

U.S. Pat. No. 7,478,173 by Matthew Delco (hereinafter Delco) entitled "Method and System for Sharing a Network Connection in a Virtual Computer System" describes methods and systems of sending and receiving IPv4 packets to and from virtual machines. The Delco patent further describes methods for replacing layer 2 addresses of virtual machine network interface cards (vNIC) by layer 2 addresses of physical network interface cards (pNIC) in an IPv4 context. However, the methods describes in the Delco patent are not sufficient to yield desired results in an IPv6 environment.

SUMMARY

In one embodiment, a method for sharing a network connection between a host system and a virtual machine is disclosed. The network connection connects a host system to a computer network. The method includes sending an outgoing data frame from the virtual machine to the computer network. The host system is enabled to use the network connection using a first layer 2 address and a first layer 3 address. The first layer 2 address and the first layer 3 address are associated with the network connection. The virtual machine is enabled to attempt to use the network connection using a second layer 2 address and a second layer 3 address. The first layer 3 address and the second layer 3 address being compliant with IPv6. An occurrence of the second layer 2 address is replaced within the outgoing data frame with the first layer 2 address. And, if the outgoing data frame includes a network discover protocol (NDP) message of a selected type, the second layer 2 address in the NDP message is replaced by the first layer 2 address.

In another embodiment, a method for sharing a network connection between a host system and a virtual machine is disclosed. The network connection connects a host system to a computer network. The method includes receiving an incoming data frame from the virtual machine to the computer network. The host system is enabled to use the network connection using a first layer 2 address and a first layer 3 address. The first layer 2 address and the first layer 3 address are associated with the network connection. The virtual machine is enabled to attempt to use the network connection using a second layer 2 address and a second layer 3 address. The first layer 3 address and the second layer 3 address being compliant with IPv6. Checksum in the incoming data frame is inspected and if the checksum is incorrect, a new checksum is computed and the incoming data frame is updated with the new checksum prior to send the incoming data frame to the virtual machine. The incoming data frame originates from the host system and destined for the virtual machine, the virtual machine running on the host system.

In yet another embodiment, a computer readable media for storing programming instruction for sharing a network connection between a host system and a virtual machine is disclosed. The network connection connecting a host system to a computer network. The computer readable media includes programming instructions for sending an outgoing data frame from the virtual machine to the computer network, the programming instructions for sending the outgoing data frame includes programming instructions for enabling the host system to use the network connection using a first layer 2 address and a first layer 3 address, the first layer 2 address and the first layer 3 address being associated with the network connection and programming instructions for enabling the virtual machine to attempt to use the network connection using a second layer 2 address and a second layer 3 address, the second layer 2 address being different from the first layer 2 address and the second layer 3 address being different from the first layer 3 address. The first layer 3 address and the second layer 3 address being compliant with IPv6. The computer readable media further includes programming instructions for replacing an occurrence of the second layer 2 address within the outgoing data frame with the first layer 2 address, so that the data frame appears to have originated from a network entity using the first layer 2 address and the second layer 3 address and programming instructions for determining if the outgoing data frame includes a network discover protocol (NDP) message of a selected type, and programming instructions for replacing the second layer 2 address in the NDP message by the first layer 2 address.

DETAILED DESCRIPTION

Figure 1:
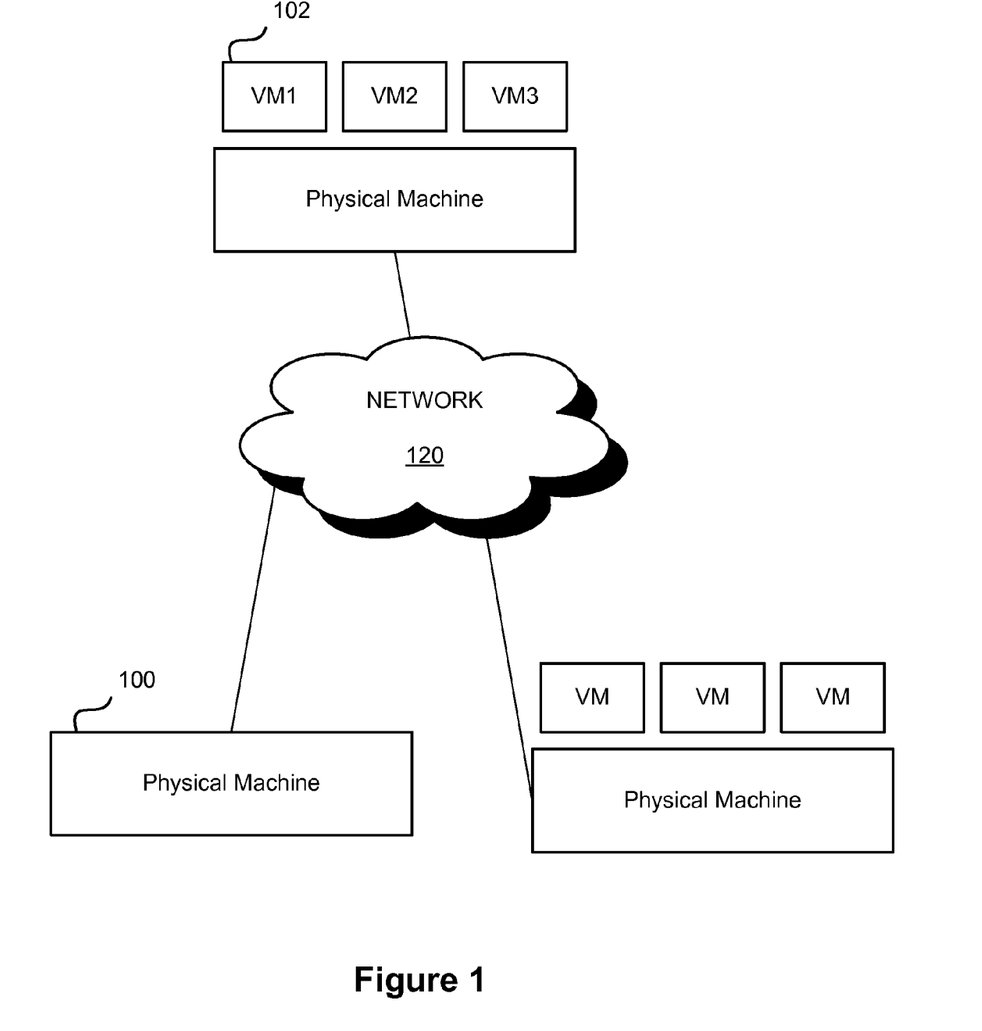
FIG. 1 illustrates virtual and physical machines interconnected through a network.
Figure 2:
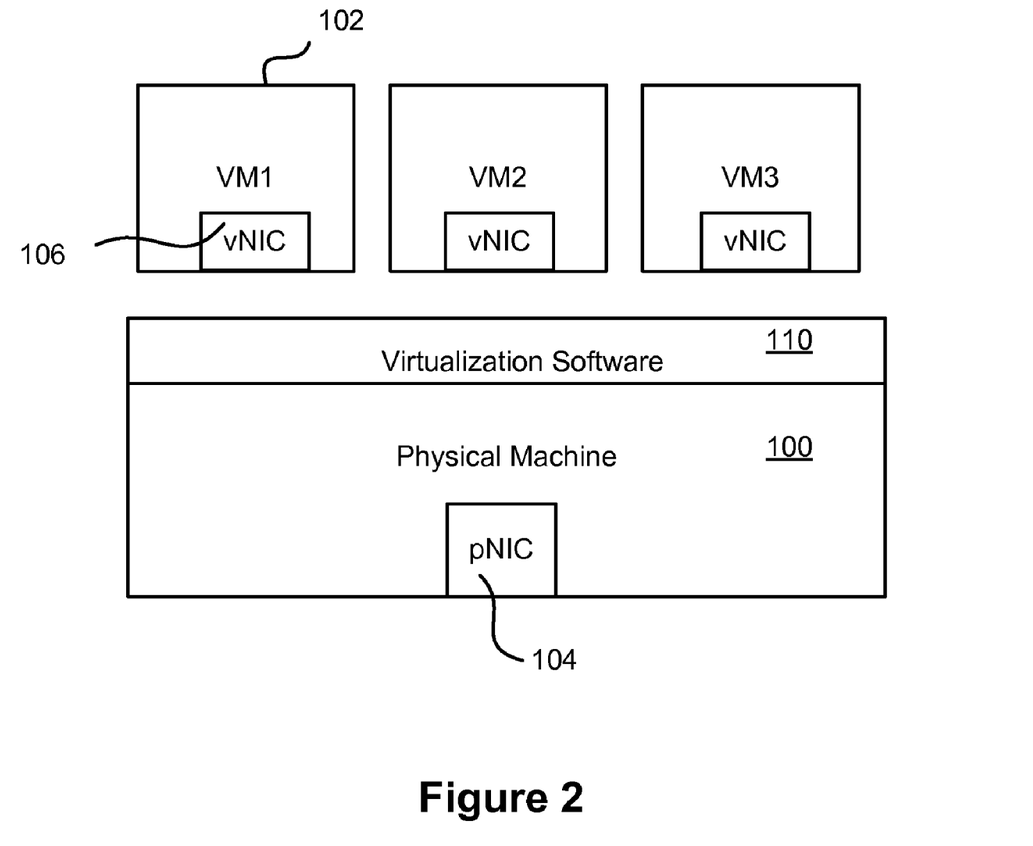
FIG. 2 illustrates a schematic diagram of a physical machine having a virtualization software and virtual machines in accordance with one or more embodiments of the present invention.

FIG. 1 illustrates a system including virtual machines 102 and physical machines 100 interconnected through a network 120. The network 120 could be a Local Area Network, a Wide Area Network or the Internet. FIG. 2 illustrates a schematic diagram of a physical machine 100 that includes a Virtualization Software 110 (example—VMware ESX Server™, Microsoft Hyper-V™, etc.) and a physical network interface card (pNIC) 104. Virtualization Software 110 and Physical Machine (or host system) 100 cooperatively host and execute one or more virtual machines 102. Each virtual machine includes a virtual network interface card (vNIC) 106.

A virtual machine generally shares the underlying physical machine's network connection. A virtual machine sharing the underlying physical machine's network connection may not use, under certain situations, virtual machine's own layer 2 address in the packet the virtual machine sends. One such situation includes a virtual machine sharing the wireless network connection of the physical machine. In this case, many access points drop packets from wireless network connections that carry a different layer 2 address than the wireless network connection's own layer 2 address. Further, even in the case of wired networks, network switches can be programmed to drop packets that carry a different layer 2 address.

Figure 3A:
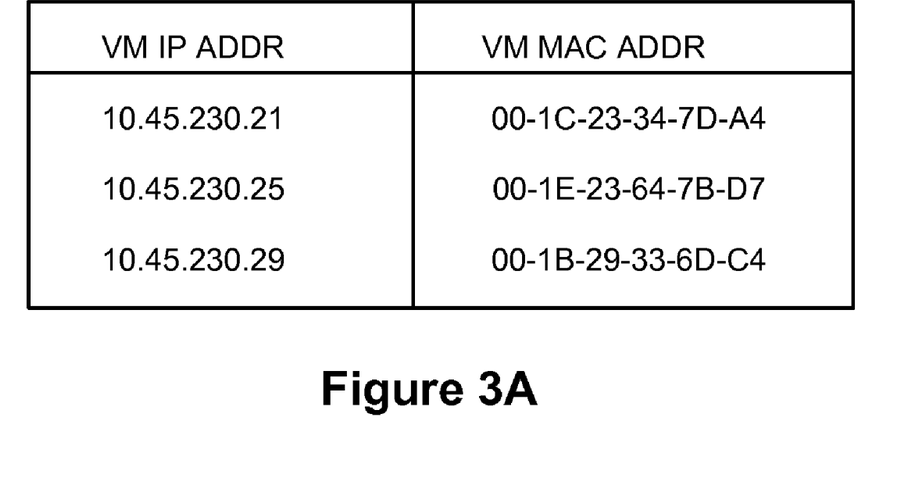
FIG. 3A illustrates a data table including IP addresses of virtual machines and corresponding MAC addresses in accordance with one or more embodiments of the present invention.
Figure 3B:
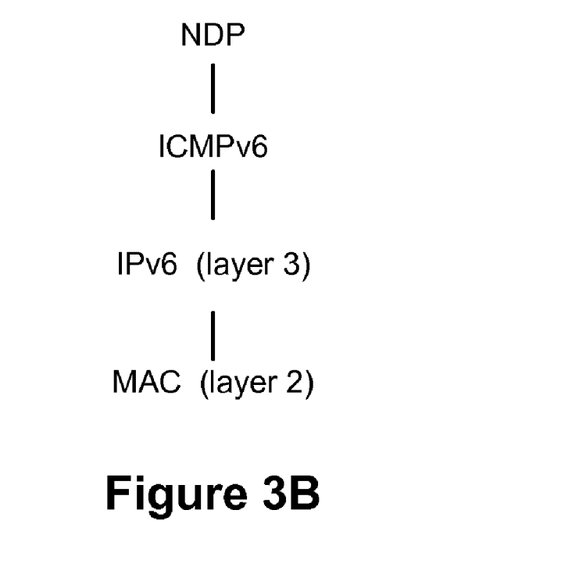
FIG. 3B illustrates layers of the IPv6 protocol.

FIG. 3A shows a data table that is maintained by the physical machine. This data table includes IP addresses of virtual machines running on a physical machine and their corresponding layer 2 (or MAC) addresses. To overcome the packet drop issue as described above, when a virtual machine sends an IPv6 packet out, the layer 2 source address in the packet is replaced by the layer 2 address of pNIC 104. The packet is parsed to obtain the layer 3 (IPv6) source address in the packet and both the layer 2 address and the layer 3 address are stored in the data table of FIG. 3A. When an IPv6 packet is received by a pNIC from another node (i.e., another physical machine or a virtual machine running on another physical machine), the packet is parsed to obtain the layer 3 (IPv6) destination address. The data table of FIG. 3B is then looked up to retrieve the layer 2 address of the destination virtual machine. The layer 2 destination address in the packet is then replaced with the layer 2 address of the virtual machine obtained from the lookup table of FIG. 3A.

FIG. 3B illustrates various layers of IPv6 protocol. The layers as shown in FIG. 3B includes Neighbor Discover Protocol (NDP) layer. The NDP is used by nodes to discover the layer 2 addresses of other nodes or routers. The NDP is also used by nodes and routers to advertise their own layer 2 addresses.

Figure 4:
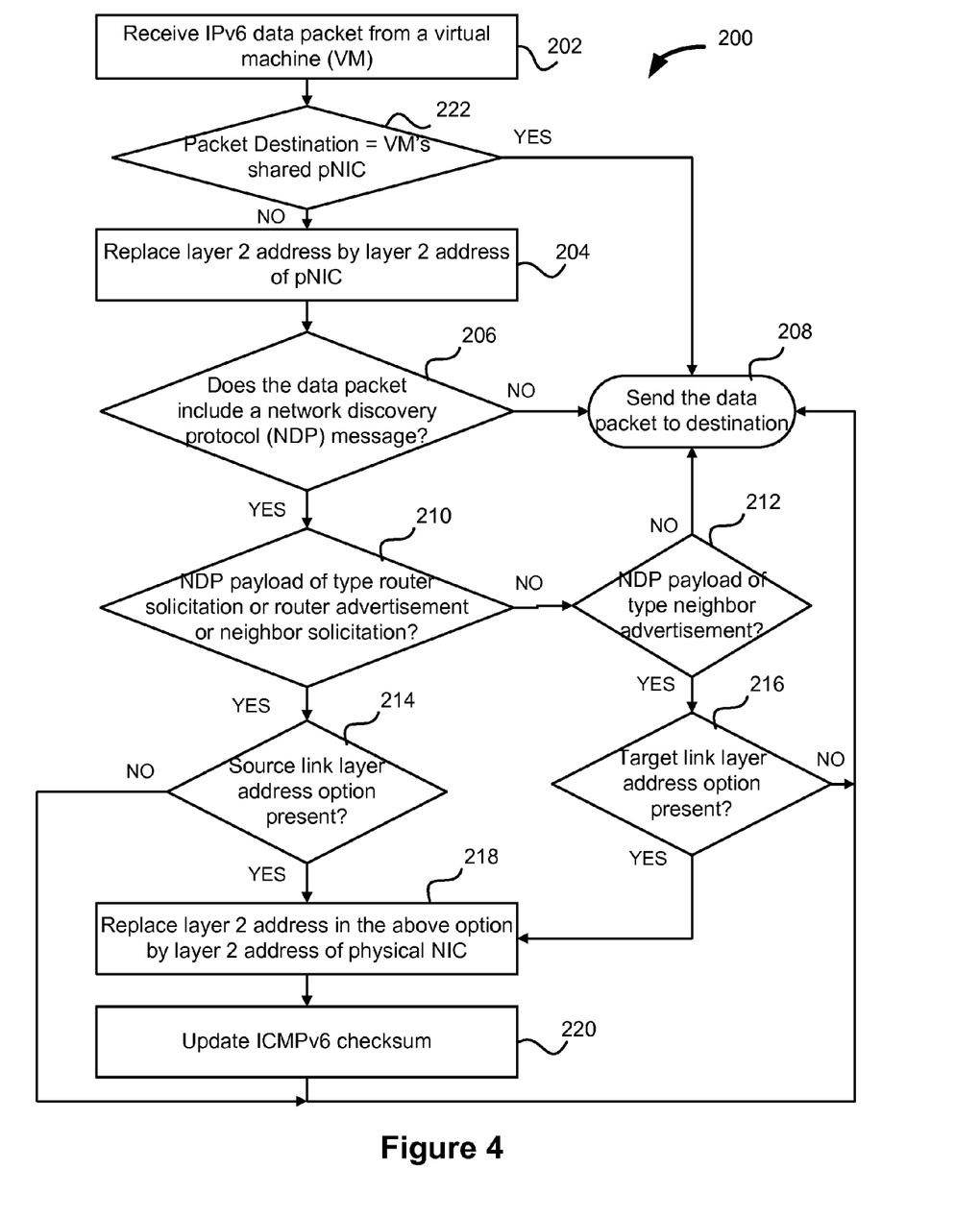
FIG. 4 illustrates a flow diagram of replacing layer 2 addresses in accordance with one or more embodiments of the present invention.

FIG. 4 illustrates a process 200 of inspecting an IPv6 packet and to replace the layer 2 address of the source virtual machine by the layer 2 address of the physical connection that is being shared by the source virtual machine. In one embodiment, the process 200 is executed in Virtualization Software 110 (FIG. 2). In another embodiment, the process 200 can be executed outside of Virtualization Software 110. At step 202, the physical machine (on which the source virtual machine is running) receives an IPv6 packet from the source virtual machine. At decision step 222, a determination is made whether the destination of the IPv6 packet is the shared pNIC. If yes, at step 208, the IPv6 packet is sent to the destination (the shared pNIC in this case). If no, then at step 204, the layer 2 address in the IPv6 packet is replaced by the layer 2 address of the shared pNIC. At decision step 206, the IPv6 packet is inspected to determine if the IPv6 packet includes a NDP message. If no, at step 208, the IPv6 packet is sent to its destination. If yes, then at decision step 210 a determination is made if the NDP message is of type router solicitation or router advertisement or neighbor solicitation. If no, at decision step 212, a determination is made if the NDP message is of type neighbor advertisement. If no, at step 208, the IPv6 packet is sent to its destination. If yes, at decision step 216, a determination is made if the target link layer address option is present in the NDP message. If no, at step 208, the IPv6 packet is sent to its destination. If yes, at step 218, the layer 2 address in the target link layer address option is replace by the layer 2 address of the shared pNIC.

Going back to decision step 210, if the answer is yes, then at decision step 214 a determination is made if the source link layer address option is present in the NDP message. If no, at step 208, the IPv6 packet is sent to its destination. If yes, at step 218, the layer 2 address in the source link layer address option is replace by the layer 2 address of the shared pNIC. At step 220, the ICMPv6 checksum is updated in the IPv6 packet and the IPv6 packet is sent to its destination.

Since outgoing packets from virtual machines get their layer 2 source address (and NDP source or target link-layer addresses) replaced by the layer 2 address of the physical network connection, some operating systems (e.g., Windows™) running on the physical machine do not generate replies (especially to NDP requests from the virtual machines). In order to make IPv6 networking work correctly between the physical machine and the virtual machine, the virtualization module needs to identify when a packet from the virtual machine is destined for the physical machine, and if yes, then the layer 2 address replacement or the NDP source or target link-layer address replacement is bypassed. The virtualization module keeps track of the IPv6 addresses associated with the physical machine. Most operating systems provide kernel programming interfaces to get notifications when an IPv6 address is added or removed from the machine's network connections. An example is Windows's IP helper API. The virtualization module (Virtualization Software 110 in FIG. 2) uses such notifications to keep track of IPv6 addresses associated with physical network connections on the machine. Outgoing IPv6 packets from virtual machines are checked to detect if the destination IPv6 address is associated with the physical network connection that is shared by the virtual machine. If the answer is yes, then the layer 2 address replacement or link-layer address replacement in NDP packets is not performed. If the answer is no, then the replacement is performed. This allows IPv6 network connectivity between the virtual machine and the underlying physical machine to work correctly.

Some network connections provide checksum offload capability. For such physical network connections, the packets sent from a physical machine destined for a virtual machine running on the physical machine may not have correct checksum computed in them when they are received by the virtualization module (Virtualization Software 110 in FIG. 2) to be propagated to the virtual machine. The virtualization module needs to inspect the packet for incorrect TCP or UDP checksum, compute the checksum and modify the packet contents with the correct checksum before propagating the packet to the virtual machine.

Figure 5:
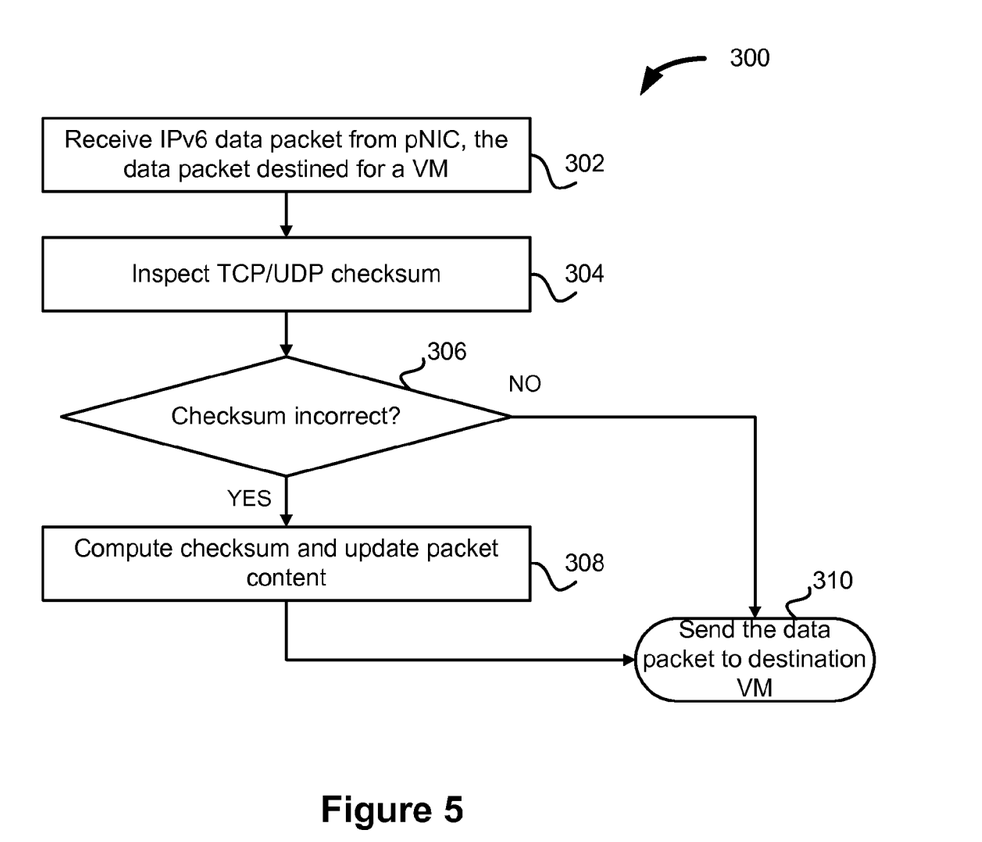
FIG. 5 illustrates a flow diagram of computing checksum in accordance with one or more embodiments of the present invention.

FIG. 5 illustrates a process 300 of verifying and updating checksum in incoming IPv6 packets. In one embodiment, the process 300 is executed in Virtualization Software 110 (FIG. 2). In another embodiment, the process 300 can be executed outside of Virtualization Software 110, in a physical host, for example. At step 302, an IPv6 packet originates from a physical host, the IPv6 packet is destined for a virtual machine (VM), which is running on the physical host. At step 304, the TCP/UDP checksum in the received IPv6 packet is inspected. At decision step 306, a determination is made if the TCP/UDP checksum is incorrect. If no, at step 310, the IPv6 packet is sent to the destination VM. If yes, at step 308, a correct checksum is computed and the content of the IPv6 packet are updated. The IPv6 packet is then sent to the destination VM, at step 310.

Some network connections provide TCP segmentation offload or UDP fragmentation offload capability where a large TCP or UDP packet is handed off to a network connection to be split into smaller pieces before transmission. If the physical network connection has this capability, then large packets arrive at the virtualization module (Virtualization Software 110 in FIG. 2). In one embodiment, these large packets originate from a physical machine and destined to a virtual machine, which is running on the physical machine. The virtualization module needs to split such packets in smaller fragments, update the TCP or UDP header in each segment with correct values (e.g. checksum, TCP sequence number, etc.) before propagating them to the destination virtual machine.

Figure 6:
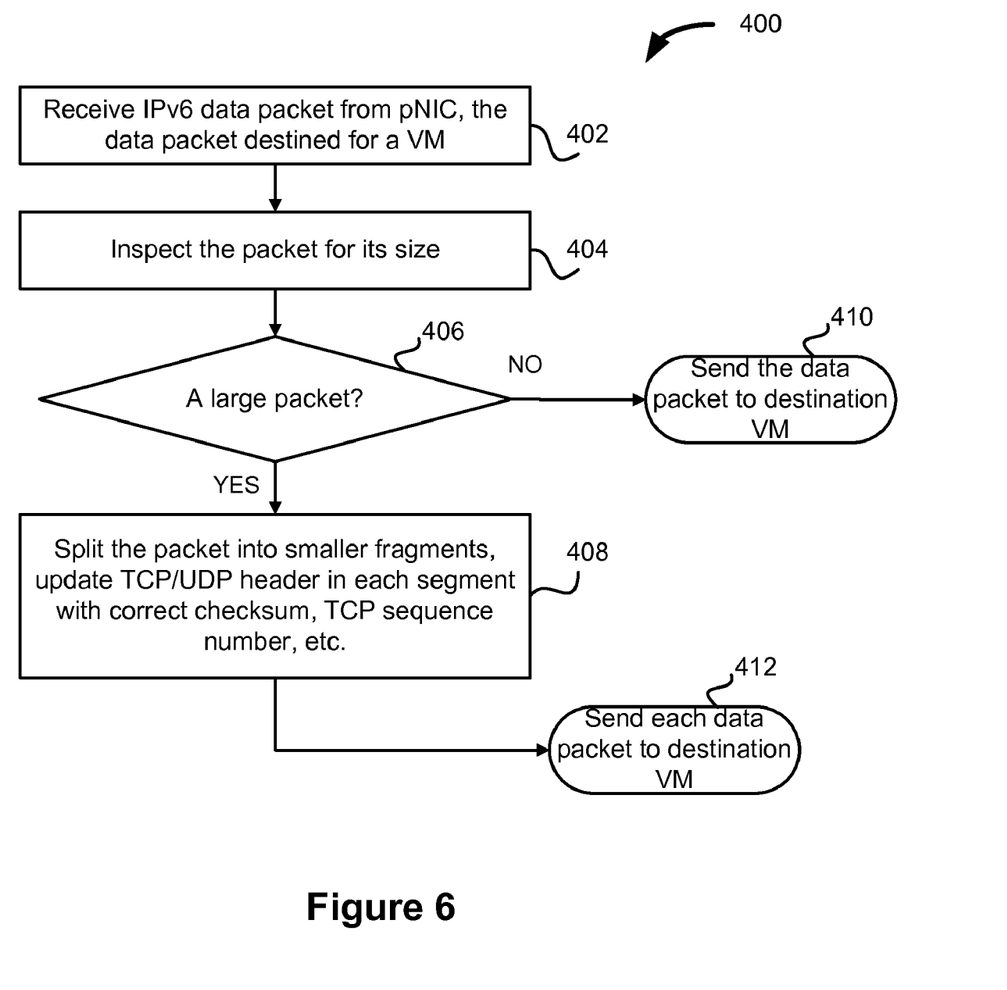
FIG. 6 illustrates a flow diagram for splitting packets in accordance with one or more embodiments of the present invention.

FIG. 6 illustrate a process 400 of splitting large IPv6 packets into smaller fragments. In one embodiment, the process 400 is executed in Virtualization Software 110 (FIG. 2). In another embodiment, the process 400 can be executed outside of Virtualization Software 110. At step 402, an IPv6 packet originates from a physical host, the IPv6 packet destined for a destination virtual machine which shares the network connection with the pNIC and runs on the physical host. At step 404, the packet is inspected for its size. At decision step 406, a determination is made if the size of the IPv6 packet is large. A large packet is one whose size is larger than the MTU (Maximum Transmission Unit) of the underlying layer 2 network. For example, for Ethernet, the MTU is typically 1514 bytes. If no, at step 410 the IPv6 packet is sent to the destination VM. If yes, at step 408, the IPv6 packet is broken into smaller fragments and the TCP or UDP header in each segment is updated with the correct checksum, TCP sequence number, etc. Then at step 412, each segment is sent to the destination VM.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for sharing a network connection between a host system and a virtual machine, the network connection connecting the host system to a computer network, the method comprising:
sending an outgoing data frame from the virtual machine to the computer network, including:
enabling the host system to use the network connection using data frames comprising a first layer 2 address and a first layer 3 address, wherein the first layer 2 address and the first layer 3 address is associated with the host system, and the first layer 3 address is compliant with Internet Protocol Version 6 (IPv6);
enabling the virtual machine to attempt to use the network connection using data frames comprising a second layer 2 address and a second layer 3 address, wherein the second layer 2 address and the second layer 3 address is associated with the virtual machine, and the second layer 2 address being different from the first layer 2 address, and the second layer 3 address being different from the first layer 3 address, and the second layer 3 address being compliant with IPv6;
replacing an occurrence of the second layer 2 address within the outgoing data frame with the first layer 2 address of the host system, so that the outgoing data frame appears to have originated from the host system rather than from the virtual machine based on the use of the first layer 2 address and the second layer 3 address; and
if the outgoing data frame includes a neighbor discover protocol message of a selected type, replacing the second layer 2 address in the neighbor discover protocol message by the first layer 2 address.

2. The method as recited in claim 1, wherein the selected type of the neighbor discover protocol message is one of router solicitation, router advertisement, or neighbor solicitation.

3. The method as recited in claim 1, wherein the selected type of the neighbor discover protocol message is neighbor advertisement.

4. The method as recited in claim 2, wherein the replacing the second layer 2 address in the neighbor discover protocol message is performed if a source link layer address option is present in the neighbor discover protocol message.

5. The method as recited in claim 3, wherein the replacing the second layer 2 address in the neighbor discover protocol message is performed if a target link layer address option is present in the neighbor discover protocol message.

6. The method as recited in claim 1, further including updating ICMPv6 checksum in the outgoing data frame before sending the outgoing data frame to the computer network.

7. A non-transitory computer readable media for storing programming instructions which when executed by a computer system cause the computer system to perform a method for sharing a network connection between a host system and a virtual machine, the network connection connecting a host system to a computer network, the method comprising:

instructions for sending an outgoing data frame from the virtual machine to sending an outgoing data frame from the virtual machine to the computer network, including:

enabling the host system to use the network connection using data frames comprising a first layer 2 address and a first layer 3 address, wherein the first layer 2 address and the first layer 3 address is associated with the host system, and the first layer 3 address is compliant with Internet Protocol Version 6 (IPv6);

enabling the virtual machine to attempt to use the network connection using data frames communication comprising a second layer 2 address and a second layer 3 address, wherein the second layer 2 address and the second layer 3 address is associated with the virtual machine, and the second layer 2 address being different from the first layer 2 address, and the second layer 3 address being different from the first layer 3 address, and the second layer 3 address being compliant with IPv6;

replacing an occurrence of the second layer 2 address within the outgoing data frame with the first layer 2 address of the host system, so that the outgoing data frame appears to have originated from the host system rather than from the virtual machine based on the first layer 2 address and the second layer 3 address; and determining if the outgoing data frame includes a neighbor discover protocol message of a selected type, then replacing the second layer 2 address in the neighbor discover protocol message by the first layer 2 address.

8. The non-transitory computer readable media as recited in claim 7, wherein the selected type of the neighbor discover protocol message is one of router solicitation, router advertisement, or neighbor solicitation.

9. The non-transitory computer readable media as recited in claim 8, wherein the replacing the second layer 2 address in the neighbor discover protocol message is executed if a source link layer address option is present in the neighbor discover protocol message.

10. The non-transitory computer readable media as recited in claim 8, wherein the replacing the second layer 2 address in the neighbor discover protocol message is executed if a target link layer address option is present in the neighbor discover protocol message.

11. The non-transitory computer readable media as recited in claim 8, further including updating ICMPv6 checksum in the outgoing data frame before sending the outgoing data frame to the computer network.

12. The non-transitory computer readable media as recited in claim 7, wherein the selected type of the neighbor discover protocol message is neighbor advertisement.

* * * * *